Oct. 22, 1940.  F. BARTA  2,218,866
AIR BRAKE
Filed July 26, 1938
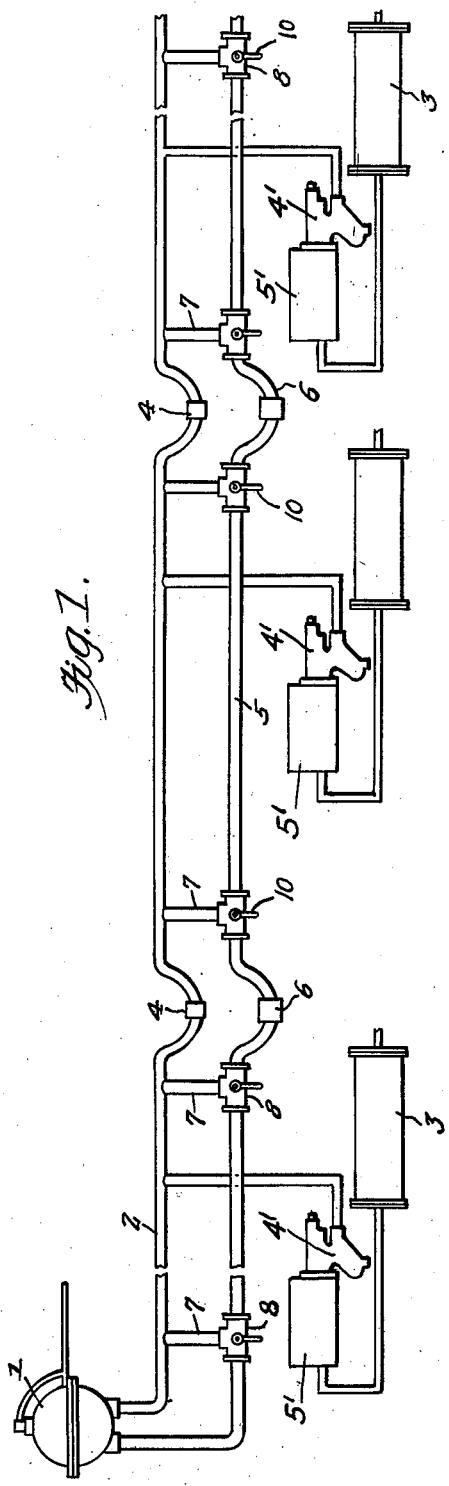
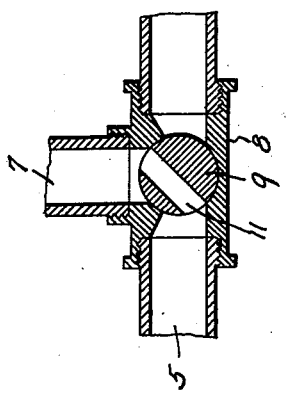
Inventor
Frank Barta,
By Clarence A. O'Brien
and Hyman Berman
Attorneys Patented Oct. 22, 1940

2,218,866

UNITED STATES PATENT OFFICE 2,218,866

AIR BRAKE

Frank Barta, Smithville, Tex.

Application July 26, 1938, Serial No. 221,363

1 Claim. (Cl. 303—47)

My invention relates to improvements in air brake controls such as are used for controlling railway trains.

The primary object of the invention is to provide air brake equipment for use more particularly on heavy trains to apply the brakes from the tail end of the train forwardly, successively throughout the cars of the train so as to take out all slack gradually prior to stopping, and thereby obviate the usual well-known slack actions and reactions occurring in trains, together with the consequent damage to train equipment, shipments, and discomfort to passengers.

To the accomplishment of the foregoing, and the subordinate objects presently appearing, a preferred embodiment of my invention has been illustrated in the accompanying drawing, set forth in detail in the succeeding description and defined in the claim appended hereto.

In said drawing:

Figure 1 is a fragmentary diagrammatic view illustrating the preferred form of my invention, and Figure 2 is a detail view in section of one of the control valves.

Describing my invention in detail, with reference to the drawing by numerals, 1 designates the usual brake control valve such as is located in the locomotive cab and having therein a service chamber, not shown, and 2 the usual brake pipe line from the valve 1 to the brake cylinders 3 of different cars, not shown, and including the usual couplings 4 between the cars. The numeral 4' designates the usual triple valves and 5' the reservoir associated with the brake cylinders 3. The numeral 5 designates an auxiliary line leading from said service chamber of the valve 1 to the rear of the train and including couplings 6 between cars. The brake pipe line 2 and the auxiliary line 5 are connected at each end of each car by cross-over pipes 7 and the control valves 8 at the juncture of each pipe 7 with the auxiliary line 5. Each control valve 8 includes a core 9 adapted to be set by a handle 10 into opening or closing positions, respectively. The core 9 of each valve 8 is ported, as at 11, so that when it is set into opening position it directs, and flows the air from the brake valve 1 straight through the auxiliary line 5, but, when set to closing position it establishes communication between the auxiliary line 5 and the brake pipe line 2 shunting the air from said line 5 to said line 2.

The brake control valve 1 is of the usual type used in present-day train control air brake systems and commonly designated as the automatic brake valve. As is well known this valve 1 is interposed in the line of connection between the main and pressure equalizing reservoirs and the brake pipe line 2 and is settable into five different positions to effect variation in pressure in the brake pipe line commonly termed reductions. These positions of said valve 1 are termed "Release," "Running," "Holding," "Lap," "Service" and "Emergency." In the "Release" position of said valve 1 air flows directly from the main reservoir to the brake pipe line 2 to quickly charge the brake system and release brakes on long trains. In the "Running" position a predetermined pressure reduction is maintained in the brake pipe line and system lower than that in the main reservoir to release the brakes. In the "Holding" position a reduction is maintained in the system to set the brakes on the locomotive and tender while releasing and recharging the train brakes, the same as in the case of the "Release" position except that the locomotive and tender brakes are not released. In the "Lap" position a previous reduction in the brake pipe line and system is maintained, no variation being effected. In the "Service" position air from line 2 and the equalizing reservoir is automatically flowed to atmosphere through said valve 1 to effect slow reduction and set the brakes. In the "Emergency" position air in the line 2 and equalizing reservoir is quickly flowed directly to atmosphere to effect a heavy reduction and quickly set the brakes. In the practice of my invention, the brake pipe line 2 is connected to said brake valve 1 for control by the "Emergency" setting of said valve only. The auxiliary line 5 is connected to said valve 1 for control under all settings of the latter. Under ordinary condition, the last valve core 9 at the tail end of the train is set to closing position and the remaining cores 9 to opening position thereby establishing a circuit from the brake valve 1 through said pipe 5 to the last crossover pipe 7 and said pipe 2 back to valve 1.

Under these conditions, the brake system is conditioned by setting the brake valve to "Running" position wherein, as will be understood, a predetermined pressure is maintained in both lines 2 and 5 to maintain the brakes in released position, the air flowing through the described circuit from brake valve 1 back to but not out of said valve.

To apply brakes under ordinary conditions, the brake valve 1 is set to "Service" position thereby creating a pressure reduction in the line 5 and hence in the line 2 and when the reduction is sufficient, said brake valve 1 is set back to "Lap"

position to hold the reduction in the line until the train has stopped. Obviously the air is flowed in this reduction to atmosphere from valve 1, line 5, last valve core 9, last crossover 7, and line 2 in succession and in the order named. Thus the brakes on the last car are set first and those of the preceding cars successively from front to rear. If the reduction thus first effected is not heavy enough, a second reduction may be obtained by again setting the brake valve 1 to "Service" position until a desired second reduction is obtained at which point said valve 1 may be set back to "Lap" position to maintain the second reduction in the lines until the train has stopped. To release the brakes, brake valve 1, under ordinary condition, is set to "Running" position to recharge the lines and system. Obviously, the brakes are released in the same order of succession as in setting. To quickly release the brakes, the brake valve 1 may be set to "Release" position to quickly charge the brake system and release the brakes in the same order as will now be clear. In the "Emergency" setting of the brake valve 1 air is flowed direct to atmosphere through said valve from both lines 2 and 5 thus effecting a quick heavy reduction and hence a quick stop, the brakes being set from rear to front successively. The result following setting of the brake valve 1 to "Holding" position need not, it is thought, be entered into in view of the preceding description.

Therefore upon a first reduction, the brakes begin to apply on the last car first and successively on the preceding cars, thus taking out the slack in the train successively from rear to front thereof so that when the head end is reached the slack is all out. Upon a second reduction the brakes in the rear car begin to set harder holding the slack out so that no slack action or reaction occurs. Upon release of the brakes, those on the rear cars release first creating loose slack action or free wheeling which is very desirable.

My invention will, it is believed, be readily understood from the foregoing without further explanation.

Manifestly, the invention as described, is susceptible of modification without departing from the inventive concept and right is herein reserved to such modifications as fall within the scope of the subjoined claim.

What I claim is:

In an air brake system for the cars of a railway train, a brake control valve for location at the front end of the train, a plurality of brake cylinders for said cars, respectively, a triple valve and an air reservoir for each cylinder, a brake pipe line extending from said control valve and connected to said triple valves from the front to the rear of the train successively to service said triple valves and cause application and release of the brakes, respectively, an auxiliary line extending from the control valve alongside the brake pipe line for charging and reducing said brake pipe line under control of said control valve, and valved crossover lines between said auxiliary and brake pipe lines at each end of each car for charging and reducing the brake line from the rear of any selected car whereby said brakes may be set and released in a train of a selected number of cars from the rear end of the train forwardly and successively throughout the train.

FRANK BARTA.